United States Patent
Chen

(10) Patent No.: US 7,290,459 B2
(45) Date of Patent: Nov. 6, 2007

(54) TRANSMISSION FOR A DUNE BUGGY

(75) Inventor: Ho-Jen Chen, Tainan Hsien (TW)

(73) Assignee: Standard Motor Corporation, Kandtien Hsiang, Tainan Hsien (TW)

( * ) Notice: Subject to any disclaimer, the term of this patent is extended or adjusted under 35 U.S.C. 154(b) by 368 days.

(21) Appl. No.: 11/158,207

(22) Filed: Jun. 20, 2005

(65) Prior Publication Data
US 2005/0284686 A1 Dec. 29, 2005

(30) Foreign Application Priority Data
Jun. 29, 2004 (TW) ............................... 093210149

(51) Int. Cl.
*F16H 19/00* (2006.01)
(52) U.S. Cl. ........................................ 74/323
(58) Field of Classification Search ................ 74/322, 74/323

See application file for complete search history.

(56) References Cited

U.S. PATENT DOCUMENTS 1,506,724 A * 8/1924 Norton .......................... 74/35
2,768,757 A * 10/1956 Barry .......................... 414/540

* cited by examiner

*Primary Examiner*—Dirk Wright
(74) *Attorney, Agent, or Firm*—patenttm.us; James H. Walters.

(57) ABSTRACT

A transmission for a dune buggy has a transaxle, a transmission gear assembly, a forward bevel gear, a reverse bevel gear, a counterrotation bevel gear, a sleeve and a gear shifting lever assembly. The transmission gear assembly is mounted around the transaxle and is rotated by a motor in the dune buggy. The forward and reverse bevel gears are mounted rotatably around the transaxle. The forward bevel gear connects to the transmission gear assembly. The counterrotation bevel gear meshes with the forward and reverse bevel gears. The sleeve is mounted securely on the transaxle, slides longitudinally on the transaxle and selectively engages the forward or reverse bevel gears. The gear shifting lever assembly connects to the sleeve. Moving the gear shifting lever moves the sleeve.

8 Claims, 3 Drawing Sheets

# TRANSMISSION FOR A DUNE BUGGY

BACKGROUND OF THE INVENTION

1. Field of the Invention

The present invention relates to a transmission for a vehicle, especially to a transmission for a dune buggy.

2. Description of the Prior Arts

Sandy-beach activities are popular in modern times. Driving dune buggies is a popular beach activity. Dune buggies use a transmission to drive forward or backward. A conventional transmission in a dune buggy comprises a transmission shaft, a forward gear, a reverse gear, a shifting gear, a connector, a threaded shaft, a connecting gear and a connecting shaft connected to a motor. The forward and reverse gears are mounted around the transmission shaft. The shifting gear is rotated by and is mounted securely on the transmission shaft between the forward and the reverse gears, selectively engages the forward gear or the reverse gear and has an annular groove formed on the shifting gear. The connector has a sleeve and an extension rod. The sleeve has an inner threaded hole. The extension rod is formed transversely on the sleeve and is attached to the annular groove of the shifting gear. The threaded shaft screws into the inner threaded hole in the sleeve. The connecting gear engages the threaded shaft. The connecting shaft is attached to the connecting gear. The motor connects to the connecting shaft and rotates the connecting shaft with the connecting gear.

The connecting gear rotates the threaded shaft, When the threaded shaft rotates, the sleeve with the extension rod moves forward or backward along the threaded shaft. The extension rod pushes the shifting gear forward or backward along the transmission shaft. When the shifting gear engages the forward gear, the transmission shaft rotates the shifting gear with the forward gear and the dune buggy moves forward. When the shifting gear engages the reverse gear, the transmission shaft rotates the shifting gear with the reverse gear and the dune buggy moves backward.

However, the conventional transmission in a dune buggy comprises many components and is too complicated.

To overcome the shortcomings, the present invention provides a simplified transmission in a dune buggy to mitigate or obviate the aforementioned problems.

SUMMARY OF THE INVENTION

The main objective of the present invention is to provide a transmission for a dune buggy that is simple and reduces transmission lag. The transmission for a dune buggy has a transaxle, a transmission gear assembly, a forward bevel gear, a reverse bevel gear, a counterrotation bevel gear, a sleeve and a gear shifting lever assembly. The transmission gear assembly is mounted around the transaxle and is rotated by a motor in the dune buggy. The forward and reverse bevel gears are mounted around the transaxle. The forward bevel gear connects to the transmission gear assembly. The counterrotation bevel gear meshes with the forward and reverse bevel gears. The sleeve is mounted securely on the transaxle and selectively engages the forward or reverse bevel gears. The gear shifting lever assembly connects to the sleeve. Moving the gear shifting lever moves the sleeve.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
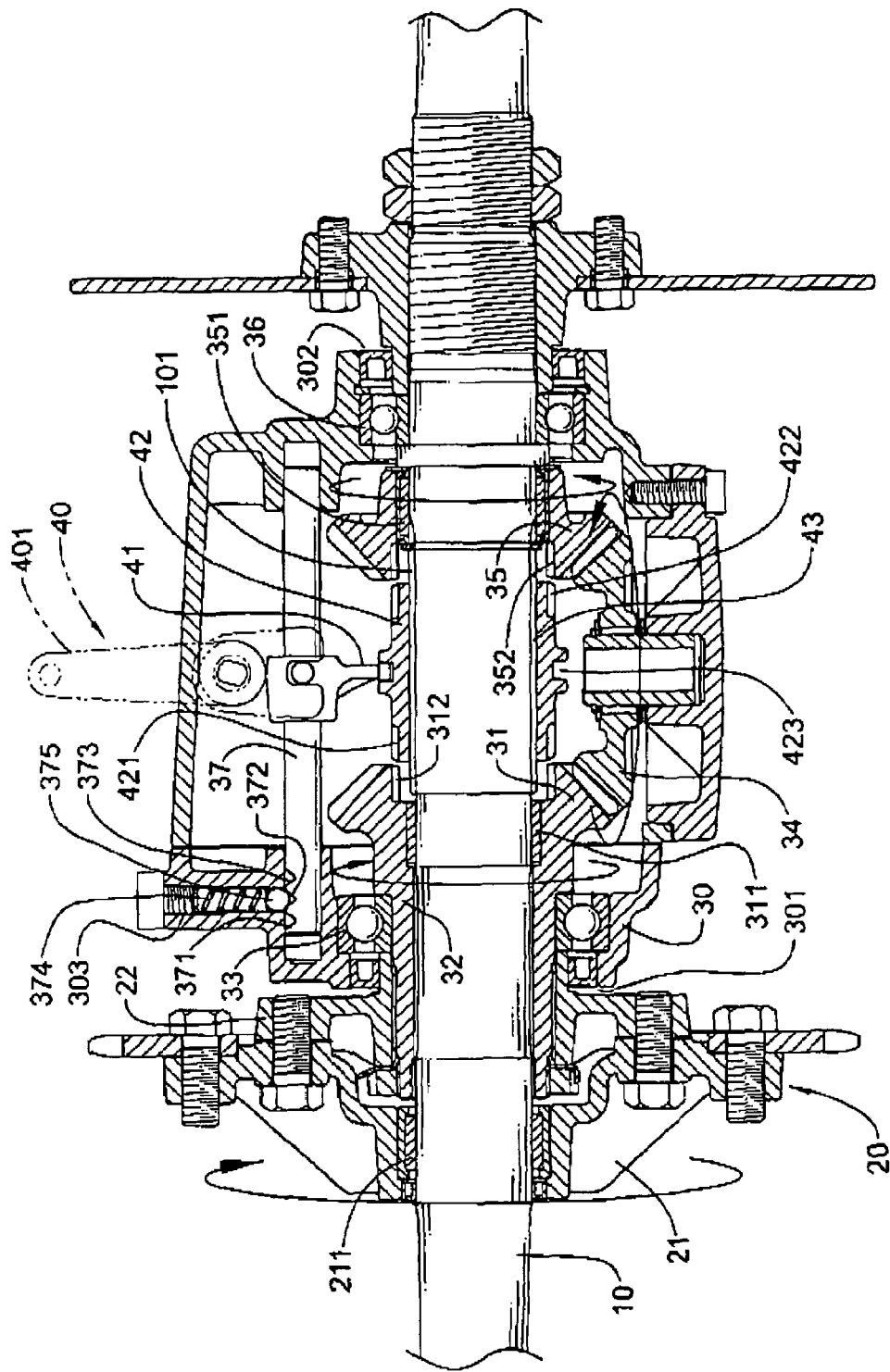
FIG. 1 is a side view in partial section of a transmission for a dune buggy in accordance with the present invention.

With reference to FIG. 1, a transmission for a dune buggy in accordance with the present invention comprises a transaxle (10), a transmission gear assembly (20), a casing (30), an optional transaxle bearing (36), a forward bevel gear (31), an optional forward shaft bearing (311), an optional casing bearing (33), a reverse bevel gear (35), an optional reverse shaft bearing (351), a counterrotation bevel gear (34), a sleeve (42) and a gear shifting lever assembly (40).

The transaxle (10) is attached to two drive wheels of the dune buggy and may have a shaft gear (101). The shaft gear (101) is formed around the transaxle (10).

The transmission gear assembly (20) is mounted rotatably around the transaxle (10), connects to and is rotated by a motor of the dune buggy and has an outer gear (21), an optional outer bearing (211) and an inner gear (22). The outer gear (21) is mounted rotatably around the transaxle (10) so the outer gear (21) and the transaxle (10) to rotate independently. The outer bearing (211) is mounted around the transaxle (10) between the outer gear (21) and the transaxle (10). The inner gear (22) connects securely to and is rotated by the outer gear (21) and is mounted rotatably around the transaxle (10).

The casing (30) is mounted around the transaxle (10) and has a first opening (301), a second opening (302) and an optional mounting recess (303). The mounting recess (303) is formed in the casing (30).

The transaxle bearing (36) is mounted around the transaxle (10) between the second opening (302) in the casing (30) and the transaxle (10) to allow the transaxle (10) to rotate inside the casing (30).

The forward bevel gear (31) is mounted rotatably around the transaxle (10) in the casing (30) near the first opening (301) in the casing (30) and has an inner end, a gear end, an outer extension (32) and a recessed forward drive gear (312). The outer extension (32) protrudes through the first opening (301) in the casing (30) and connects to and is rotated by the inner gear (22) of the transmission gear assembly (20). The recessed forward drive gear (312) is formed in the inner end of the forward bevel gear (31).

The forward shaft bearing (31) is mounted around the transaxle (10) between the forward bevel gear (31) and the transaxle (10).

The casing bearing (33) is mounted around the outer extension (32) of the forward bevel gear (31) between the outer extension (32) and the casing (10).

The reverse bevel gear (35) is mounted rotatably around the transaxle (10) in the casing (30) near the second opening (302) in the casing (30), is a counterrotating gear to the forward bevel gear (31) and has an inner end, a gear end, a recessed reverse drive gear (352). The recessed reverse drive gear (352) is formed in the inner end of the reverse bevel gear (35).

The reverse shaft bearing (351) is mounted around the transaxle (10) between the reverse bevel gear (35) and the transaxle (10).

The counterrotation bevel gear (34) is mounted rotatably in the casing (30) and meshes with the gear ends of the forward and reverse bevel gears (31, 35). When the forward bevel gear (31) is rotated by the inner gear (22) of the transmission gear assembly (20), the forward bevel gear (31) rotates the counterrotation bevel gear (34), and the counterrotation bevel gear (34) rotates the reverse bevel gear (35).

The sleeve (42) is mounted on the transaxle (10) in the casing (30), slides longitudinally on the transaxle (10), selectively engages the recessed forward drive gear (312) or the recessed reverse drive gear (352), has an inner surface, an outer surface, a forward end, a reverse end, a forward gear (421), a reverse gear (422) and an optional annular groove (423) and may have an inner sleeve gear (43). The forward gear (421) is formed on the forward end of the sleeve (42) and selectively engages the recessed forward drive gear (312) of the forward bevel gear (31) to drive the transaxle (10) in a forward direction. The reverse gear (422) is formed on the reverse end of the sleeve (42) and selectively engages the recessed reverse drive gear (352) of the reverse bevel gear (35) to drive the transaxle (10) in a reverse direction. The annular groove (423) is formed in the outer surface of the sleeve (42). The inner sleeve gear (43) is formed on the inner surface of the sleeve (42), meshes with the shaft gear (101) on the transaxle (10) to allow the sleeve (42) to slide longitudinally on the transaxle (10).

The gear shifting lever assembly (40) connects to and pushes the sleeve (42) to a forward or reverse position, protrudes from the casing (30) and may have a guide rod (37), a connector (41), a gear shifting lever (401), an optional spring (374) and an optional ball (375). The guide rod (37) is mounted slidably in the casing (30) and has an optional detent assembly. The detent assembly is formed on the guide rod (37), corresponds to the mounting recess (303) in the casing (30) and has a reverse detent (371), a neutral detent (372) and a forward detent (373). The neutral detent (372) is between the reverse and forward detents (371, 373). The connector (41) connects the gear shifting lever assembly (40) to the sleeve (42) and has a tubular end and an extension end. The tubular end of the connector (41) is attached securely to the guide rod (37). The extension end of the connector (41) extends into the annular groove (423) in the sleeve (42). The gear shifting lever (401) is mounted pivotally on the tubular end of the connector (41) and protrudes from the casing (30). The spring (374) is mounted in the mounting recess (303) in the casing (30). The ball (375) is mounted in the mounting recess (303), is pressed by the spring (374) and selectively engages the reverse, neutral or forward detents (371, 372, 373) of the detent assembly on the guide rod (37) to hold the sleeve (42) in position.

Figure 2:
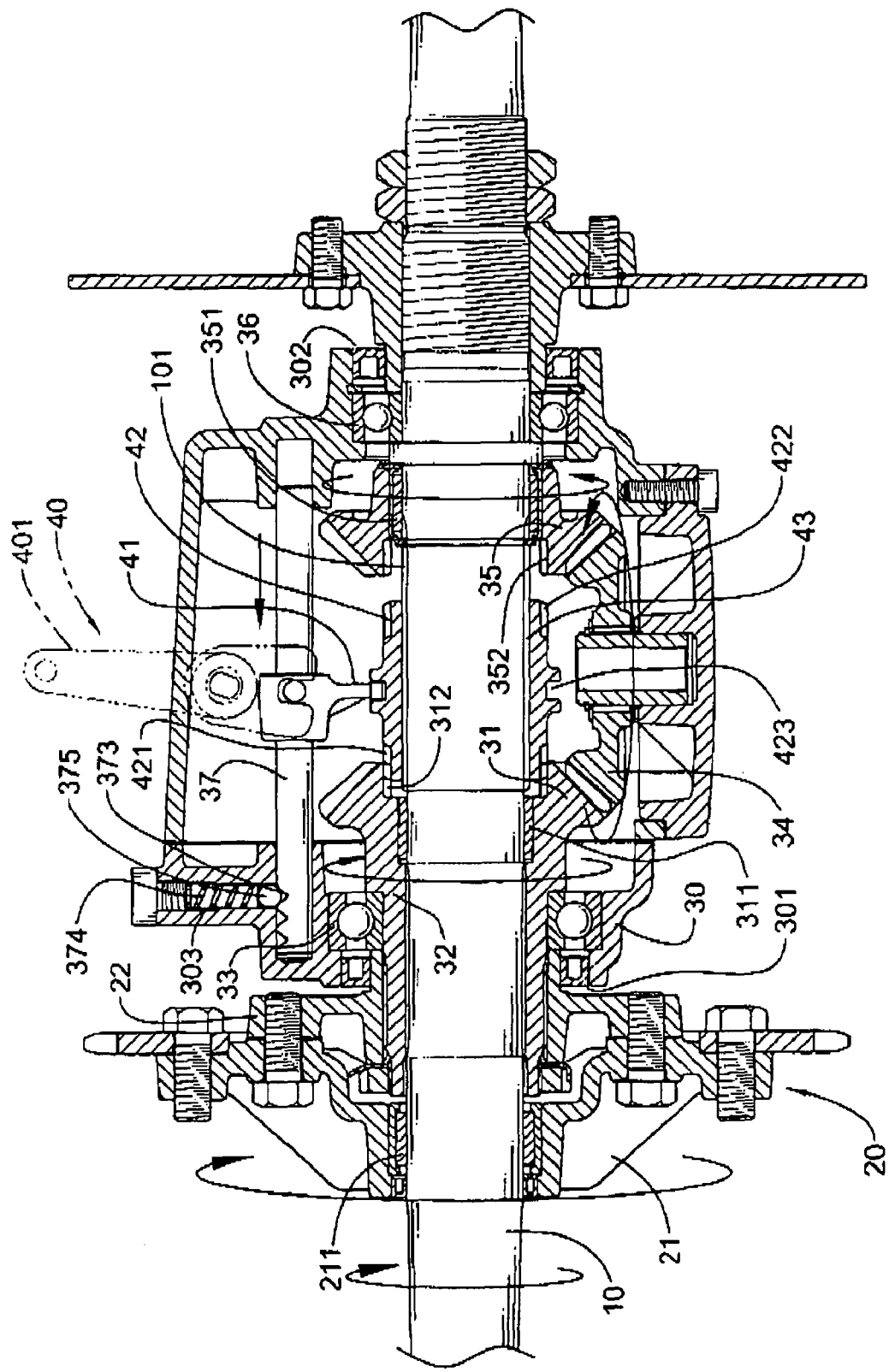
FIG. 2 is an operational side view in partial section of the transmission in FIG. 1 when the dune buggy is in gear to move forward.

With further reference to FIG. 2, a dune buggy is driven forward by pivoting the gear shifting lever (401) so the tubular end of the connector (41) moves the guide rod (37) and the extension end of the connector (41) to push the sleeve (42). The sleeve (42) is pushed to make the forward gear (421) of the sleeve (42) engage the recessed forward drive gear (312) of the forward bevel gear (31) thereby driving the transaxle (10) in a forward direction. The ball (375) in the mounting recess (303) in the casing (30) engages the forward detent (375) of the detent assembly on the guide rod (37) and holds the sleeve (42) in the forward position. Although the forward bevel gear (31) rotates the counterrotation bevel gear (34) and the counterrotation bevel gear (34) rotates the reverse bevel gear (35), the reverse bevel gear (35) idles around the transaxle (10) because the reverse bevel gear (35) is mounted rotatably around the transaxle (10) and is not engaged with the sleeve (42). Therefore the dune buggy is driven forward.

Figure 3:
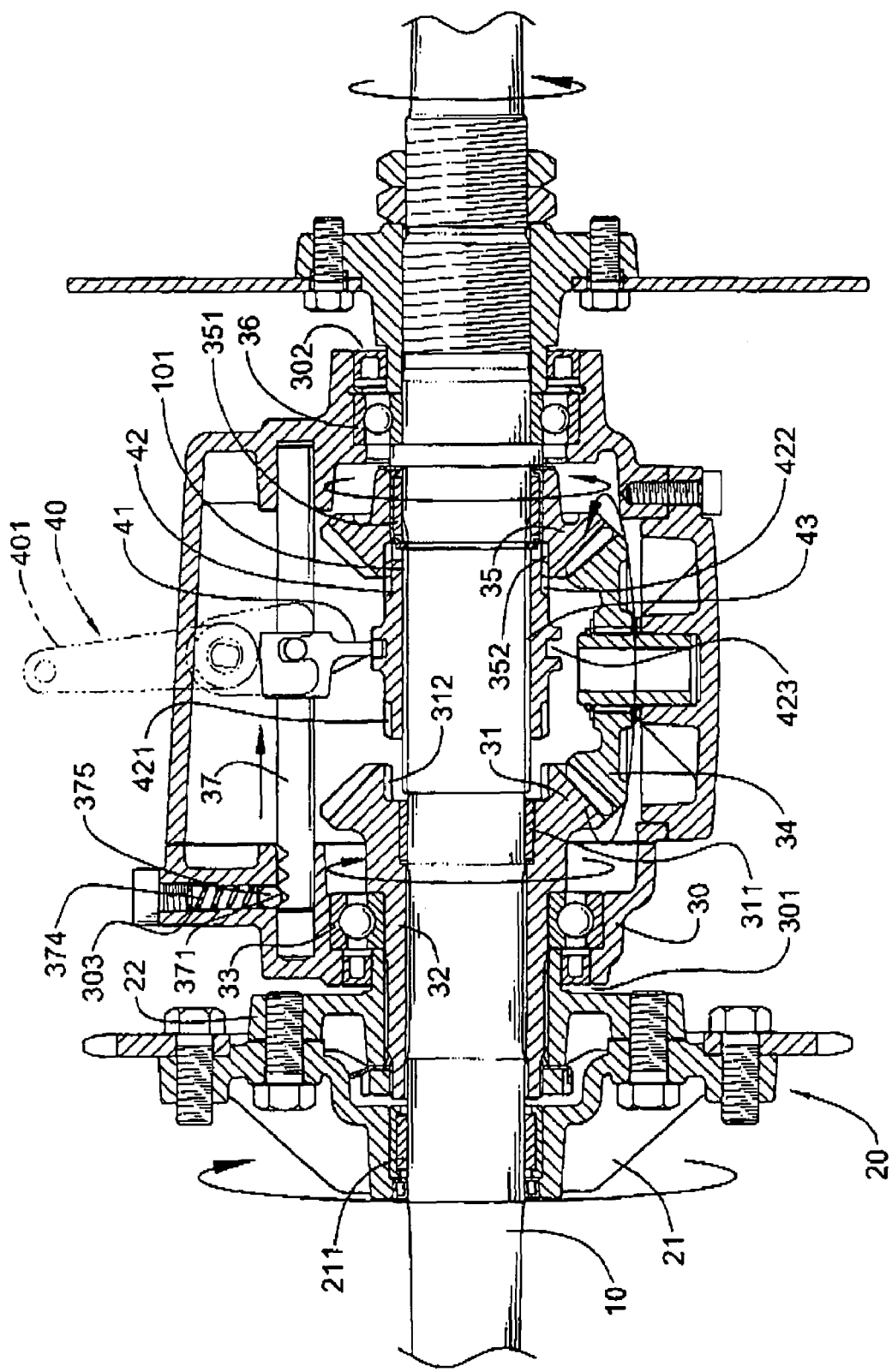
FIG. 3 is an operational side view in partial section of the transmission when the dune buggy is only allowed to move backward.

With further reference to FIG. 3, the dune buggy is driven backward by pivoting the gear shifting lever (401) so the tubular end of the connector (41) moves the guide rod (37) and the extension end of the connector (41) to push the sleeve (42). The sleeve (42) is pushed to make the reverse gear (422) of the sleeve (42) engage the recessed reverse drive gear (352) of the reverse bevel gear (35). The ball (375) in the mounting recess (303) in the casing (30) engages the reverse detent (375) of the detent assembly on the guide rod (37) and holds the sleeve (42) in the reverse position. Because the reverse gear (422) of the sleeve (42) engages the recessed reverse drive gear (352) of the reverse bevel gear (35), the reverse bevel gear (35) rotates the sleeve (42). Because the sleeve (42) is mounted securely on the transaxle (10), the transaxle (10) is rotated by the sleeve (42) in the same direction as the reverse bevel gear (35). Therefore the dune buggy can only move backward.

The transmission as described is simpler and comprises fewer components than the conventional transmission. With the three bevel gears (31, 34, 35) constantly engaged and rotating and a single gear (421, 422) inserted into the gear train to shift the rotating direction of the transaxle (10), the transmission between the bevel gears (31, 34, 35) is more responsive.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A transmission for a dune buggy comprising
   a transaxle adapted to be attached to two drive wheels of the dune buggy;
   a transmission gear assembly mounted rotatably around the transaxle, adapted to be rotated by a motor of the dune buggy and having
      an outer gear mounted rotatably around the transaxle; and
      an inner gear connecting securely to and rotated by the outer gear and mounted rotatably around the transaxle;
   a casing mounted around the transaxle and having
      a first opening; and
      a second opening;
   a forward bevel gear mounted rotatably around the transaxle in the casing near the first opening and having
      an inner end;
      a gear end;
      an outer extension protruding from the first opening in the casing and connecting to and rotated by the inner gear of the transmission gear assembly; and
      a recessed forward drive gear formed in the inner end of the forward bevel gear;
   a reverse bevel gear mounted rotatably around the transaxle in the casing near the second opening, being a counterrotating gear to the forward bevel gear and having an inner end;
a gear end; and
a recessed reverse drive gear formed in the inner end of the reverse bevel gear;
a counterrotation bevel gear mounted rotatably in the casing and meshing with the gear ends of the forward and reverse bevel gears;
a sleeve mounted on the transaxle in the casing, sliding longitudinally on the transaxle, selectively engaging one of the recessed forward drive gear and the recessed reverse drive gear and having
an inner surface;
an outer surface;
a forward end;
a reverse end;
a forward gear formed on the forward end of the sleeve and selectively engaging the recessed forward drive gear of the forward bevel gear to drive the transaxle in a forward direction; and
a reverse gear formed on the reverse end of the sleeve and selectively engaging the recessed reverse drive gear of the reverse bevel gear to drive the transaxle in a reverse direction; and
a gear shifting lever assembly connecting to and pushing the sleeve to move and protruding from the casing.

2. The transmission as claimed in claim 1, wherein
the transmission gear assembly has an outer bearing mounted around the transaxle between the outer gear and the transaxle;
the transmission further has
a transaxle bearing mounted around the transaxle between the second opening of the casing and the transaxle;
a forward shaft bearing mounted around the transaxle between the forward bevel gear and the transaxle; and
a casing bearing mounted around the outer extension of the forward bevel gear between the outer extension and the casing; and
the reverse bevel gear has a reverse shaft bearing mounted around the transaxle between the reverse bevel gear and the transaxle.

3. The transmission as claimed in claim 1, wherein
the casing has a mounting recess formed in the casing;
the sleeve has an annular groove formed in the outer surface of the sleeve; and
the gear shifting lever assembly has
a guide rod mounted slidably in the casing;
a connector connecting the gear shifting lever assembly to the sleeve and having
a tubular end attached securely to the guide rod; and
an extension end extending into the annular groove in the sleeve; and
a gear shifting lever mounted pivotally on the tubular end of the connector and protruding from the casing.

4. The transmission as claimed in claim 2, wherein
the casing has a mounting recess formed in the casing;
the sleeve has an annular groove formed in the outer surface of the sleeve; and
the gear shifting lever assembly has
a guide rod mounted slidably in the casing;
a connector connecting the gear shifting lever assembly to the sleeve and having
a tubular end attached securely to the guide rod; and
an extension end extending into the annular groove in the sleeve; and
a gear shifting lever mounted pivotally on the tubular end of the connector and protruding from the casing.

5. The transmission as claimed in claim 3, wherein
the guide rod of the gear shifting lever assembly further has a detent assembly formed in the guide rod, corresponding to the mounting recess in the casing and having a reverse detent, a neutral detent and a forward detent wherein the neutral detent is between the reverse and forward detents; and
the gear shifting lever assembly has
a spring mounted in the mounting recess in the casing; and
a ball mounted in the mounting recess, pressed by the spring and selectively engaging the reverse, neutral or forward detents of the detent assembly on the guide rod.

6. The transmission as claimed in claim 4, wherein
the guide rod of the gear shifting lever assembly further has a detent assembly formed in the guide rod, corresponding to the mounting recess in the casing and having a reverse detent, a neutral detent and a forward detent wherein the neutral detent is between the reverse and forward detents; and
the gear shifting lever assembly has
a spring mounted in the mounting recess in the casing; and
a ball mounted in the mounting recess, pressed by the spring and selectively engaging the reverse, neutral or forward detents of the detent assembly on the guide rod.

7. The transmission as claimed in claim 1, wherein
the transaxle has a shaft gear formed in the transaxle; and
the sleeve has an inner sleeve gear formed on the inner surface of the sleeve and meshes with the shaft gear on the transaxle to allow the sleeve to slide longitudinally on the transaxle.

8. The transmission as claimed in claim 6, wherein
the transaxle has a shaft gear formed on the transaxle; and
the sleeve has an inner sleeve gear formed on the inner surface of the sleeve and meshing with the shaft gear on the transaxle to allow the sleeve to slide longitudinally on the transaxle.

* * * * *